United States Patent Office 3,364,034
Patented Jan. 16, 1968

3,364,034
METHOD FOR REMOVING CHARACTERISTIC FLAVOR AND/OR ODOR FROM VEGETABLE PROTEIN MATERIALS
Theodore M. Hoersch, Park Forest, and Joseph L. Shank, Tinley Park, Ill., assignors to Swift & Company, Chicago, Ill., a corporation of Illinois
No Drawing. Filed Mar. 9, 1964, Ser. No. 350,549
6 Claims. (Cl. 99—98)

This invention relates to improvements in the processing and manufacture of food products and, more particularly, to the treatment of food products normally possessing characteristic flavors and odors, which although not objectionable to all consumers may be objectionable to a large proportion of consumers, to remove said flavors and odors from such foods.

Many foods including certain vegetable protein substances, such as soybeans, protein hydrolysates, and wheat gluten meal, possess characteristic "beany" or cereal flavors and odors which limit the sale and use of such materials because the flavor and/or odor is unappealing to large numbers of potential consumers. Similarly, some fresh meat products such as organ meats, including kidneys and liver, although a delicacy to some are objectionable to others because of the characteristic flavor and/or odor. Yet all of these products are nutritionally valuable, containing substantial amounts of protein along with some fat, and if such foods can be deflavored the size of the potential consuming group can be increased considerably.

Efforts to remove characteristic flavors and odors from foods possessing unappealing odors and flavors have in the past been directed to chemical procedures primarily utilizing enzymes. While such procedures have been successful with some foods, they are not uniformly efficient in deflavoring many other foods. In addition, such procedures are comparatively expensive, adding to the cost at which the food is marketed. Other attempts at overcoming consumer resistance to certain highly nutritious foods having characteristic flavor and/or odor have involved adding flavor masking agents to the foods.

It is accordingly an object of this invention to provide an efficient and economical method for treating food products having a characteristic flavor and/or odor to remove such flavor and/or odor therefrom.

Another object of the invention is to provide a method for deflavoring food products possessing a characteristic flavor and/or odor to produce a bland product having the nutritional values unaffected by said method.

Still another object of the invention is the provision of a method for deflavoring vegetable protein material such as soybeans, soybean products, corn, corn products, wheat gluten meal, vegetable protein hydrolysates, etc. to provide highly nutritious bland products.

Additional objects of the invention if not specifically set forth herein will be readily apparent to those skilled in the art from the detailed description of the invention which follows.

Generally, the invention comprises contacting meat and vegetable protein products such as hog kidneys, mutton, hydrolyzed casein, feather meal, soybean meal, soybean flour, wheat gluten meal, corn meal, cottonseed meal, and hydrolyzed vegetable proteins, which have a characteristic flavor which is unappealing to large segments of the consuming group with nonpathogenic, saprophytic bacteria, proliferating said bacteria in said food product and deactivating the bacteria after said bacteria have been incubated for a time sufficient to remove the flavor and/or odor from such food product. The method is very inexpensive to carry out yet highly effective in providing bland foods free of flavor and odor normally associated with the particular food undergoing the deflavoring treatment.

More specifically, the flavor and/or odor removal process of the invention involves the addition to the food product undergoing treatment of a small amount of a nontoxic bacteria or mixture of nontoxic bacteria and incubating the bacteria in contact with the food product for a time sufficient to effect substantial removal of the flavor and odor components by bacterial action. Bacterial action can then be terminated by heating to a temperature of not less than 140° F. or by cooling as in a blast freezer to 40° F. or less and the food can then be subjected to further processing as required.

Bacteria useful in the process of this invention include nonpathogenic organisms of the families Lactobacteriaceae, Micrococcaceae, Pseudomonodaceae and Enterobacteriaceae. Gram positive organisms of the genera Lactobacillus, Pediococcus, Leuconostoc and Streptococcus, are particularly useful in the process. Specific organisms of these genera which may be employed include *Lactobacillus lactis, Lactobacillus bulgaricus, Lactobacillus acidophilus, Leuconostoc citrovorum, Pediococcus cerevisiae* and *Streptococcus lactis*. Typical organisms of the family Micrococcaceae suitable for use in the invention include *Micrococcus citreus*. Gram negative organisms which can be employed as deflavoring agents, in accordance with the method of the invention, include the nonpathogenic species of the family Enterobacteriaceae, genera Pseudomonads, Proteus and Aeobacter. Specific bacteria of these genera include *Pseudomonae fragi* and *Aerobacter aerogenes*.

The food product undergoing treatment for flavor and/or odor removal in accordance with the method of the invention is inoculated with a culture of the aforementioned bacteria or mixtures thereof and the inoculated product is held under conditions conducive to bacterial growth for about 16–144 hours. The particular temperature and length of time at that temperature most effective in promoting bacterial growth varies with the particular organisms, although the inoculated product is usually maintained at a temperature in the range of about 32–100° F. and preferably at a temperature of about 75–90° F. The rate of bacterial growth for a given organism increases with increasing incubation temperature up to the optimum growth temperature for a specific organism. Thus the flavor removal procedure can be accelerated by carrying out the incubation at higher temperatures but the temperature must not be so high as to adversely affect bacterial action.

Only a small amount of the culture is required to carry out the deflavoring process. The amount used is not critical inasmuch as the bacteria grow and multiply rapidly. In most cases about 0.5–2.0% of the culture on a volume to weight of substrates should be added to the product. In the preferred form of the invention about 0.75–1.25% volume per weight is used. The culture is prepared by growing the bacteria in a culture medium containing assimilable sources of carbon, nitrogen and oxygen. Suitable media contain mineral salts, yeast, sugar and gelatin. Another suitable nutrient medium comprises brain heart infusion agar.

The following examples show applications of the invention to various products. These examples should not be construed as placing any limitation on the invention inasmuch as they are set forth herein only for purposes of illustration.

*Example 1*

500 grams of defatted, finely ground soybean flour was mixed with 1500 milliliters of distilled water. 20 grams of sodium chloride and 200 milligrams of sodium nitrite were added to the mixture to inhibit bacterial action. The mixture was then autoclaved for 20 minutes at 250° F. and 15 pounds of pressure. After cooling the bacteria-free soybean slurry, 10 milliliters of an 18 hour Micrococcus culture was added to 1010 grams of the slurry while the remaining 1010 grams served as a noninoculated control. The Micrococcus culture was prepared by growing stock cultures on grain heart infusion agar (Difco) and transferred weekly. Prior to use transfers were made to brain heart infusion broth which was incubated for 18 to 24 hours at 86° F. A 1% inoculum on a volume to weight of substrate basis was employed.

Both the inoculated and noninoculated samples were allowed to remain at 78° F. for 18 hours and at the end of this period the inoculated sample was devoid of soybean flavor, while the noninoculated sample had the characteristic soybean taste. Both samples were then stuffed into 22/23 mm. artificial frankfurter casings and steamed for 30 minutes at 212° F. A product resembling a frankfurter resulted when the casings were removed. The noninoculated sample continued to have the characteristic taste and odor of soybeans while the product prepared from the inoculated sample was very bland.

*Example II*

225 grams of ground mutton was mixed with 100 milliliters of water. Into the aqueous meat product was added 3.15 grams sodium chloride, 0.9 gram sodiumtripolyphosphate, 2.25 grams dextrose, and 37 milligrams sodium nitrite. After thorough mixing to distribute the salts uniformly throughout the meat mixture, the mixture was inoculated with 2 milliliters of an 18 hour culture of the organism described in Example I. The inoculated meat mixture was incubated at 78° F. for 18 hours. The resulting product was free of typical mutton flavor both before and after cooking the sample.

*Example III*

50 grams of wheat gluten meal was mixed with 1500 milliliters of distilled water and 15 milliliters of a 2.5% aqueous solution of papain. The mixture was held at 140° F. for 18 hours, followed by boiling for 20 minutes to deactivate the enzyme. After cooling, the mixture was filtered, and 25 grams dextrose, 96 milligrams sodium nitrite, 192 milligrams sodium nitrate, and 48 grams sodium chloride were incorporated into the filtrate. The pH of the filtrate was adjusted to 6.5 with 5 N sodium hydroxide and the solution was autoclaved for 20 minutes at a temperature of 250° F. and 15 pounds pressure. The sample was then divided into 400 milliliter aliquots and each of these aliquots was placed in a 500 milliliter sterile flask. The first aliquot was not inoculated but was held as a control. The second aliquot was inoculated with 4 milliliters of the bacteria described in Example I, and the inoculated sample was held in the stoppered flask. The third aliquot was inoculated with 4 milliliters of the bacteria of Example I and 4 grams of hydrogenated lard was added and the sample was then held in the stoppered flask. After incubating all samples were devoid of any cereal flavor and aroma while the noninoculated control possessed a flavor and odor characteristic of cereal.

A similar experiment involving the treatment of corn gluten meal wherein the inoculated samples were incubated for 144 hours at 68° F. showed substantially similar results. The inoculated samples were free of corn flavor while the typical corn flavor was manifest in the noninoculated sample.

*Example IV*

1620 grams of defatted soybean flour was blended with 1620 milliliters of distilled water and 39.2 grams of dextrose. The aqueous slurry was autoclaved for 20 minutes at 250° F. under 15 pounds pressure and the mixture was cooled. 3045 grams of ground mutton along with an additional 3500 milliliters of water was added. Also added to the mixture was 757 milligrams sodium nitrite, 18 grams sodium tripolyphosphate, and 64 grams of sodium chloride. The mixture was then agitated to distribute the ingredients uniformly throughout the mutton-flour mixture and the entire mixture was then passed through a commercial meat cutter to form an emulsion. The emulsion was divided into two parts and one part was held as a noninoculated control while 40 milliliters of a 24 hour culture of the microorganism described in Example I was added to the other part. After 24 hours incubation at 78° F. the inoculated sample had lost both the mutton and soybean flavor while the flavor of the controlled sample was still recognizable as that of mutton and soybeans.

A similar experiment involving the same samples but in which incubation was terminated after 6 hours resulted in the production of a flavor typical of veal in the inoculated mixture while a strong soybean and mutton odor persisted in the noninoculated sample.

*Example V*

250 grams of defatted soybean flour, 250 grams pork fat, 750 milliliters of distilled water, 12.5 grams sodium chloride, 125 grams sodium nitrite were mixed in a container and the mixture was then autoclaved at 250° F. for 20 minutes and 15 pounds pressure. The sample was then divided into 100 gram aliquots and various microorganisms were added to these aliquots. The samples were inoculated with the respective organisms and incubated at 78° F. for 24 hours. The specific organisms used and the results after incubation at 78° F. are as follows:

| Sample | Microorganism | Flavor after Incubation |
|---|---|---|
| A | Micrococcus citreus | Chicken. |
| B | Pediococcus cerevisiae | Do. |
| C | Lactobacillus lactis | Do. |
| D | Leuconostoc citrovorum | Do. |
| E | Pseudomonas ovalis | Bland. |

*Example VI*

The Micrococcus organism described in Example I was proliferated in a 9% aqueous sodium chloride solution which contained 120 p.p.m. sodium nitrite. 765 milliliters of the solution was mixed with an equal volume of water containing 7.28 grams sodium nitrite, 0.4 pound sugar, 1 pound sodium chloride, and 0.14 pound of a phosphate salt mixture. This solution was injected vascularly into a ham in an amount sufficient to increase the green weight of the ham by 15%. The introduction of this quantity of the bacteria solution into the ham resulted in enhancement of the flavor of the ham when the ham was compared to a noninoculated control sample.

*Example VII*

200 grams of finely ground cottonseed meal from which the fat had been removed was blended with 600 milliliters of distilled water. The resulting slurry was autoclaved at 250° F. for 20 minutes under 15 pounds pressure and the sample was divided into two parts. One part was held as a control while 3 milliliters of a 24-hour culture of *Lactobacillus acidophilus* organisms was added to the other sample. After incubation of both samples at 78° F. for 18 hours the cottonseed meal flavor was absent from the sample which had been inoculated while the noninoculated control had the typical flavor and odor of cottonseed meal.

*Example VIII*

200 grams of ground pork kidneys were mixed with 3.0 grams sodium chloride, 30 milligrams sodium nitrite, 2 grams dextrose, 100 milliliters of water and 100 grams of pork backfat. After inoculating the mixture with 4 milliliters of an 18-hour culture of *Leucontostoc citrovorum* and incubating at 78° F. for 18 hours, the bitter flavor associated with kidney meat was removed. The product was substantially bland, although all of the inherent nutritional value of the kidney meat was retained.

*Example IX*

150 grams of ground wheat was mixed with 300 milliliters of distilled water and 4.5 grams sodium chloride, 45 milligrams sodium nitrite was added. The mixture was autoclaved at 250° F. for 20 minutes under 15 pounds pressure and the autoclaved sample was then cooled. 227 grams of the autoclaved mixture which assumed the consistency of a paste was inoculated with 2.5 milliliters of a 24-hour culture of *Pediococcus cerevisiae* and the inoculated sample was incubated at 78° F. for 18 hours, followed by steaming at 212° F. for 30 minutes. After cooling of the sample, the cereal flavor was absent and there was a slight chickenlike aroma from the sample.

*Example X*

A slurry of 100 grams defatted soybean flour in 200 milliliters of distilled water was pasteurized by heating at 158° F. for 30 minutes. The pasteurized slurry was then inoculated with 3 milliliters of a culture of *Aerobacter aerogenes* and the inoculated sample was fermented for 16 hours at 75° F. Bacterial activity was terminated by cooling the product in a blast freezer to 35° F. The bland product was free of soybean flavor and odor.

It will be noted that in the treatment of vegetable products a small amount of water is added to the product to obtain contact of the product with the bacteria and also promote good distribution of the bacteria throughout the product. Also it is preferred that the product undergoing fermentation be comminuted so as to increase the efficiency of bacterial action by increasing the amount of available surface.

Obviously many variations and modifications of the invention as hereinbefore set forth may be made without departing from the spirit and scope thereof, and accordingly, only those limitations should be imposed as are indicated in the appended claims.

We claim:

1. The method for removal of characteristic flavors and/or odors from vegetable protein materials to provide a substantially bland product, comprising: inoculating said protein materials with a small amount of nonpathogenic, non-toxic bacteria selected from the group consisting of *Lactobacillus lactis, Lactobacillus bulgaricus, Lactobacillus acidophilus, Leuconostoc citrovorum, Pediococcus cerevisiae, Pseudomonas ovalis, Pseudomonae fragi, Aerobacter aerogenes, Streptococcus lactis, Micrococcus citreus* and mixtures thereof; incubating the inoculated material for about 16–144 hours under conditions conducive to bacterial growth; and terminating said bacterial growth after said material is rendered substantially bland.

2. The method of claim 1 wherein the vegetable protein materials are selected from the group consisting of soybeans, soybean products, corn, corn products, wheat, wheat gluten meal, vegetable protein hydrolysates and cottonseed meal.

3. The method of claim 1 wherein the characteristic flavor of soybeans is removed from soybean containing foods.

4. The method of claim 1 wherein the vegetable protein materials are comminuted to increase the surface area exposed to bacterial action and a small amount of water is added to promote the distribution of the bacteria.

5. The method of claim 1 wherein the protein materials are soybean products from which the characteristic beany flavor is removed and said soybean products are autoclaved prior to inoculation to render said products free from bacteria.

6. The method of claim 5 wherein the protein material is cottonseed meal.

References Cited

UNITED STATES PATENTS

| 2,225,783 | 12/1940 | Jensen et al. | 99—109 |
| 3,048,492 | 8/1962 | Barton | 99—98 X |
| 3,193,391 | 7/1965 | Jansen et al. | 99—107 X |

OTHER REFERENCES

Mills et al.: "Use of *Pediococcus cerevisiae* Starter Culture in Pork Roll," published by American Meat Institute Foundation, Chicago, Ill., bulletin No. 38, September 1958.

HYMAN LORD, *Primary Examiner*.

RAYMOND N. JONES, A. LOUIS MONACELL,
*Examiners.*

S. E. HEYMAN, *Assistant Examiner.*